(12) United States Patent
Villa et al.

(10) Patent No.: US 12,012,229 B2
(45) Date of Patent: Jun. 18, 2024

(54) SYSTEM AND METHOD FOR ROBOTIC CHARGING AIRCRAFT

(71) Applicant: Joby Aero, Inc., Santa Cruz, CA (US)

(72) Inventors: Ian Andreas Villa, San Francisco, CA (US); Luke Asher Wilhelm, Sausalito, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 48 days.

(21) Appl. No.: 17/194,881

(22) Filed: Mar. 8, 2021

(65) Prior Publication Data

US 2021/0284357 A1    Sep. 16, 2021

Related U.S. Application Data

(60) Provisional application No. 62/986,125, filed on Mar. 6, 2020.

(51) Int. Cl.
*B64F 1/36* (2017.01)
*B25J 18/00* (2006.01)
(Continued)

(52) U.S. Cl.
CPC .............. *B64F 1/364* (2013.01); *B25J 18/00* (2013.01); *B60L 53/12* (2019.02); *B60L 53/16* (2019.02);
(Continued)

(58) Field of Classification Search
CPC .......... B60L 53/12; B60L 53/16; B60L 53/35; B60L 53/62; B60L 53/65; B60L 53/66;
(Continued)

(56) References Cited

U.S. PATENT DOCUMENTS 3,035,789 A    5/1962   Young
4,022,405 A    5/1977   Peterson
(Continued)

FOREIGN PATENT DOCUMENTS

DE    202015102833 U1 *  12/2015   .......... B60L 11/1809
EP         0945841 A1      9/1999
(Continued)

OTHER PUBLICATIONS

DE-202015102833-U1 Machine Translation (Year: 2022).*
(Continued)

*Primary Examiner* — David V Henze-Gongola
(74) *Attorney, Agent, or Firm* — Dority & Manning, P.A.

(57) ABSTRACT

In one aspect, a system for charging an aircraft can include a robotic charging device, and a computing system configured to obtain data associated with a transportation itinerary and energy parameter(s) of the aircraft. The data associated with the transportation itinerary can be indicative of an aircraft landing facility at which the aircraft is to be located. The computing system can determine (e.g., select) a robotic charging device from among a plurality of robotic charging devices for charging the aircraft based on the transportation itinerary data and energy parameter(s) of the aircraft; determine charging parameter(s) for the robotic charging device based on the transportation itinerary data; and communicate command instruction(s) for the robotic charging device to charge the aircraft according to the charging parameter(s). The robotic charging device can be configured to automatically connect with a charging area of the aircraft for charging a battery onboard the aircraft.

20 Claims, 7 Drawing Sheets

(51) Int. Cl.
*B60L 53/12* (2019.01)
*B60L 53/16* (2019.01)
*B60L 53/35* (2019.01)
*B60L 53/62* (2019.01)
*B60L 53/65* (2019.01)
*B60L 53/66* (2019.01)
*B60L 58/12* (2019.01)
*B60L 58/16* (2019.01)

(52) U.S. Cl.
CPC ............... *B60L 53/35* (2019.02); *B60L 53/62* (2019.02); *B60L 53/65* (2019.02); *B60L 53/66* (2019.02); *B60L 58/12* (2019.02); *B60L 58/16* (2019.02); *B60L 2200/10* (2013.01)

(58) Field of Classification Search
CPC ...... B60L 58/12; B60L 58/16; B60L 2200/10; B64F 1/364; B25J 18/00
See application file for complete search history.

(56) References Cited

U.S. PATENT DOCUMENTS

| | | | |
|---|---|---|---|
| 5,823,468 | A | 10/1998 | Bothe |
| 5,839,691 | A | 11/1998 | Lariviere |
| 5,842,667 | A | 12/1998 | Jones |
| 6,343,127 | B1 | 1/2002 | Billoud |
| 6,892,980 | B2 | 5/2005 | Kawai |
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,328,805 | B1* | 6/2019 | Wyrobek ............... B60L 53/00 |
| 10,330,482 | B2 | 6/2019 | Chen et al. |
| 10,427,530 | B2 | 10/2019 | Ricci |
| 10,593,215 | B2 | 3/2020 | Villa |
| 10,593,217 | B2 | 3/2020 | Shannon |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 2010/0079342 | A1 | 4/2010 | Smith et al. |
| 2012/0143482 | A1* | 6/2012 | Goossen ............... G08G 5/0069 701/120 |
| 2014/0179535 | A1 | 6/2014 | Stückl et al. |
| 2014/0236390 | A1 | 8/2014 | Mohamadi |
| 2016/0311529 | A1 | 10/2016 | Brotherton-Ratcliffe et al. |
| 2016/0368464 | A1 | 12/2016 | Hassounah |
| 2017/0197710 | A1 | 7/2017 | Ma |
| 2017/0357914 | A1 | 12/2017 | Tulabandhula et al. |
| 2018/0018887 | A1 | 1/2018 | Sharma et al. |
| 2018/0053425 | A1 | 2/2018 | Adler et al. |
| 2018/0216988 | A1 | 8/2018 | Nance |
| 2018/0308366 | A1 | 10/2018 | Goel et al. |
| 2018/0320402 | A1* | 11/2018 | Evans ................... B62D 47/006 |
| 2018/0354636 | A1 | 12/2018 | Darnell et al. |
| 2019/0009756 | A1 | 1/2019 | Jacobs |
| 2019/0146508 | A1 | 5/2019 | Dean et al. |
| 2019/0221127 | A1 | 7/2019 | Shannon |
| 2019/0316849 | A1 | 10/2019 | Abrego et al. |
| 2019/0369641 | A1* | 12/2019 | Gillett ................... G05D 1/0027 |
| 2020/0103922 | A1 | 4/2020 | Nonami et al. |
| 2020/0182637 | A1 | 6/2020 | Kumar et al. |
| 2020/0269717 | A1* | 8/2020 | Gaertner ................. B60L 53/68 |
| 2020/0388166 | A1 | 12/2020 | Rostamzadeh et al. |

FOREIGN PATENT DOCUMENTS

| | | |
|---|---|---|
| EP | 2698749 A1 | 2/2014 |
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 | 5/2019 |
| WO | WO 2020252024 A1 | 12/2020 |

OTHER PUBLICATIONS

Tech Crunch, "Will the Quantum Economy Change Your Business?", Oct. 28, 2019, https://techcrunch.com/2019/10/28/will-the-quantum-economy-change-your-business/, retrieved on Oct. 29, 2019, 8 pages.

The Verge, "Volocopter envisions 'air taxi' stations that can handle 10,000 passengers a day", Apr. 17, 2018, https://www.theverge.com/2018/4/17/17243214/volocopter-flying-car-landing-station-infrastructure, retrieved on Oct. 29, 2019, 3 pages.

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

\* cited by examiner

SYSTEM AND METHOD FOR ROBOTIC CHARGING AIRCRAFT

CROSS-REFERENCE TO RELATED APPLICATIONS

This application is claims priority to U.S. Provisional Patent Application No. 62/986,125, filed Mar. 6, 2020, the entire disclosure of which is incorporated herein by reference in its entirety, for any and all purposes.

FIELD

The present disclosure relates generally to robotic charging of aircraft. More particularly, the present disclosure relates to systems and methods for robotically charging vertical take-off and landing aircraft at an aircraft landing facility.

BACKGROUND

A wide variety of modes of transport are available within cities. For example, people may walk, ride a bike, drive a car, take public transit, or use a ride sharing service. As population densities and demand for land increase, however, many cities are experiencing problems with traffic congestion and the associated pollution. Consequently, there is a need to expand the available modes of transport in ways that may reduce the amount of traffic without requiring the use of large amounts of land.

Air travel within cities may reduce travel time over purely ground-based approaches and alleviate problems associated with traffic congestion.

Vertical takeoff and landing (VTOL) aircraft provide opportunities to incorporate aerial transportation into transport networks for cities and metropolitan areas. VTOL aircraft require much less space to take-off and land than other types of aircraft, making them more suitable for densely populated urban environments. Landing, charging, and storing VTOL aircraft, however, still presents a variety of challenges.

SUMMARY

Aspects and advantages of embodiments of the present disclosure will be set forth in part in the following description, or can be learned from the description, or can be learned through practice of the embodiments.

Aspects of the present disclosure are directed to a system for charging an aircraft. The system can include one or more processors and one or more non-transitory computer-readable media that collectively store instructions that, when executed by the one or more processors, cause the system to perform operations. The operations can include obtaining data associated with a transportation itinerary of the aircraft and one or more energy parameters of the aircraft. The data associated with the transportation itinerary can be indicative of at least an aircraft landing facility at which the aircraft is to be located. The operations can include determining, based at least in part on the data associated with the transportation itinerary and the one or more energy parameters of the aircraft, a robotic charging device from among a plurality of robotic charging devices for charging the aircraft while at the aircraft landing facility; determining one or more charging parameters for the robotic charging device based at least in part on the data associated with the transportation itinerary; and communicating one or more command instructions for the robotic charging device to charge the aircraft in accordance with the one or more charging parameters. The robotic charging device can be configured to automatically connect with a charging area of the aircraft for charging a battery onboard the aircraft.

Another aspect of the present disclosure is directed to a method for charging an aircraft. The method can include obtaining data associated with a transportation itinerary of the aircraft and one or more energy parameters of the aircraft. The data can be associated with the transportation itinerary is indicative of at least an aircraft landing facility at which the aircraft is to be located. The method can include determining, based at least in part on the data associated with the transportation itinerary and the one or more energy parameters of the aircraft, a robotic charging device from among a plurality of robotic charging devices for charging the aircraft while at the aircraft landing facility; determining one or more charging parameters for the robotic charging device based at least in part on the data associated with the transportation itinerary; and communicating one or more command instructions for the robotic charging device to charge the aircraft in accordance with the one or more charging parameters. The robotic charging device can be configured to automatically connect with a charging area of the aircraft for charging a battery onboard the aircraft.

Another aspect of the present disclosure is directed to a method for charging an aircraft. The method can include determining an initial charge state of a battery of the aircraft; charging the battery onboard the aircraft; determining a charge energy delivered to the battery of the aircraft; determining a final charge state of the battery of the aircraft; and analyzing a health state of the battery of the aircraft by comparing the charge energy delivered to the battery of the aircraft with a difference between the final charge state and the initial charge state of the battery of the aircraft.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
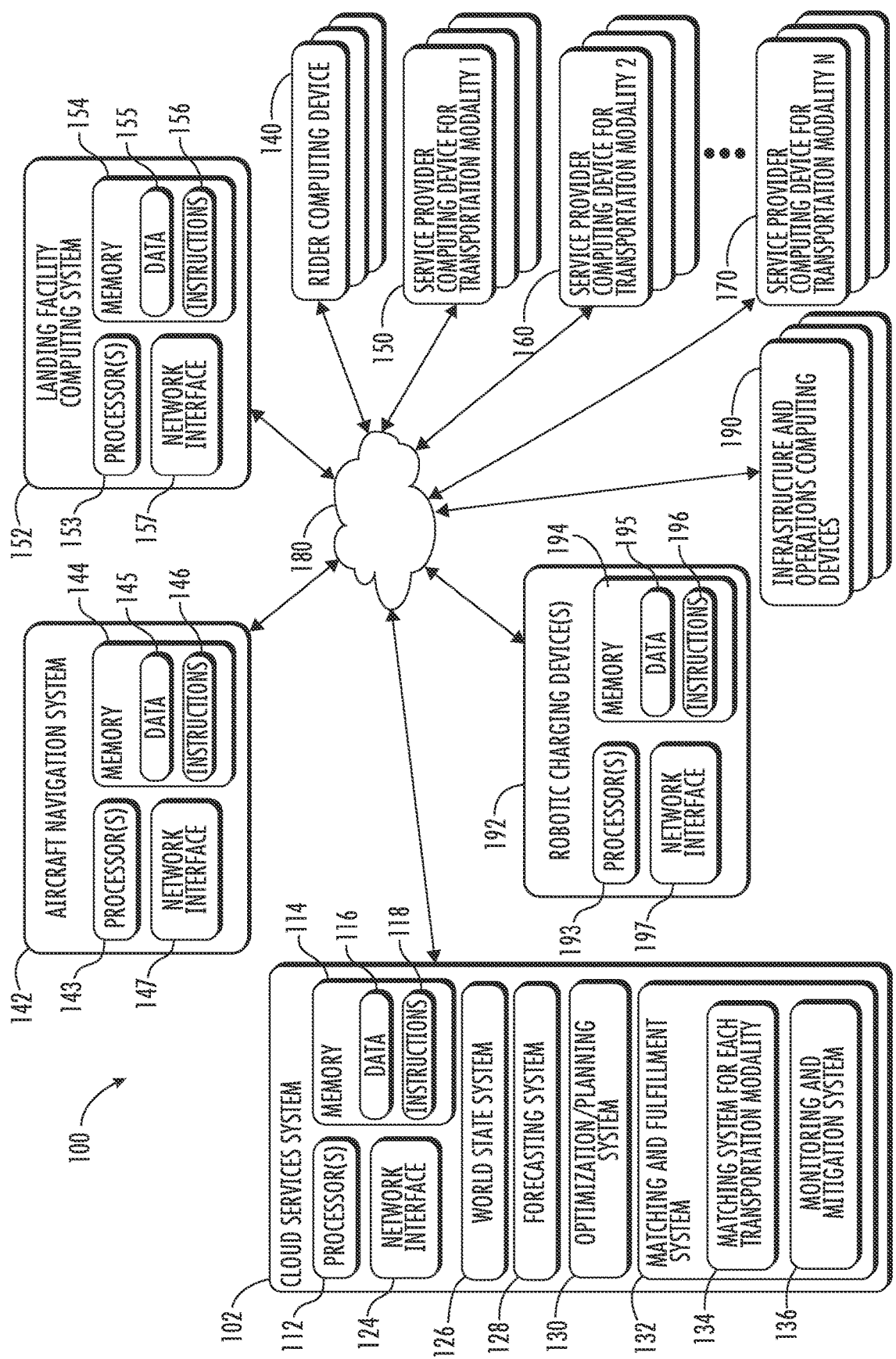
FIG. 1 depicts a block diagram of an example system according to example embodiments of the present disclosure.

Generally, the present disclosure is directed to systems and methods for charging aircraft, such as VTOL aircraft, which can be provided as a rideshare service. Quickly connecting and initiating charging of the aircraft can reduce downtime between flights and improve overall system efficiency. One or more robotic charging devices can be used to automatically connect with and charge one or more aircraft. Aspects of the present disclosure are also directed to pairing aircraft that need with charging with robotic charging devices that are available to charge the aircraft, for example at an aircraft landing and/or charging facility.

In some implementations, a fleet of robotic charging devices can be configured to service multiple aircraft, for example shortly after the aircraft land at the landing facility. The landing facility can include a landing area, parking/charging area, and/or charging facility (e.g., including one or more power sources, robotic charging devices, and so forth). A computing system can be configured to assign respective robotic charging devices (e.g., from available robotic charging devices) to aircraft in need of charging (e.g., as the aircraft approach the landing facility, after the aircraft have landed, etc.) The robotic charging devices can be assigned to or paired with the aircraft based on a variety of factors and/or data associated with the aircraft. Such intelligent pairing of robotic charging devices and aircraft can reduce aircraft downtime, reduce passenger delay, and/or improve safety.

More specifically, in some implementations, a system for charging an aircraft can include a robotic charging device, and a computing system configured to perform operations. The operations can include obtaining data associated with a transportation itinerary of the aircraft and one or more energy parameters of the aircraft. The data associated with the transportation itinerary can be indicative of at least an aircraft landing facility at which the aircraft is to be located (e.g., an aircraft landing facility that the aircraft is approaching for landing and/or at which the aircraft is scheduled to land). For example, this data can be received at a cloud services system from an aircraft navigation system of the aircraft and/or landing facility computing system. As another example, this data can be received at the landing facility computing system from the aircraft navigation system of the aircraft and/or cloud services system. For instance, the computing system can directly or indirectly receive this data from the aircraft (e.g., as the aircraft approaches the landing facility).

A robotic charging device can be determined (e.g., selected) from among a plurality of robotic charging devices for charging the aircraft while the aircraft is at the aircraft landing facility. The computing system can intelligently pair aircraft with respective robotic charging devices based on this data (e.g., to more efficiently charge the aircraft as part of a ride share service).

The data associated with the transportation itinerary of the aircraft can include passenger data and/or cargo data with respect to passengers and/or cargo aboard the aircraft. For example, this data can describe a number of passengers currently traveling in the aircraft (e.g., for a rideshare trip), a number of passengers scheduled to travel in the aircraft, and/or a payload weight (e.g., passenger and/or luggage weight) of the aircraft. As further examples, the data associated with the transportation itinerary can describe a number of passengers scheduled to board the aircraft at the current and/or subsequent aircraft landing facility. Thus, the robotic charging device can be selected from the plurality of robotic charging devices based on transportation itinerary data that describes various characteristics of the aircraft and/or the passengers aboard the aircraft.

As one example, an aircraft with a large number of passengers aboard (e.g., as compared with other aircraft in need of charging) can be prioritized for mobile robotic charging devices (e.g., that can reach a charging port located away from where the passengers will exit the aircraft) such that the passengers are not encumbered by robotic charging devices as they exit the aircraft. As a further example, the subsequent destination of the aircraft can be used to determine the required range of the aircraft and corresponding battery charge level required. The number and/or type of robotic charging devices can be selected based on the total charging energy that the aircraft needs.

The data descriptive of the transportation itinerary describe the aircraft, such as a size, a weight, and/or an approach heading of the aircraft. For example, larger aircraft can be difficult to maneuver to a stationary robotic charging device and/or position such that multiple stationary robotic charging devices can connect with the aircraft. Thus, larger aircraft can be paired with mobile robotic charging devices to more easily and/or safely charge the larger aircraft. As another example, an approach heading of an aircraft may align with a landing pad that is equipped with one or more stationary robotic charging devices. This aircraft can be paired with the stationary robotic charging devices at the landing pad that is aligned with its approach heading. Thus, the aircraft can be paired with robotic charging devices based on information about the aircraft, such as size, weight, and approach heading.

For example, if the aircraft is scheduled to travel without any passengers or cargo to subsequent location, the aircraft can be given lower priority for assignment to robotic charging devices. For instance, the aircraft can be assigned a robotic charging device to minimize delay to other aircraft that are carrying passengers and/or cargo. Additionally, such aircraft can be lower priority with respect to landing pad locations (e.g., can be selected for landing pad locations that are farther from an exit, stairway, elevator etc.).

The data associated with the transportation itinerary of the aircraft can describe the aircraft's origination location, the aircraft landing facility that the aircraft is approaching or on which the aircraft is currently landed, and/or a subsequent destination of the aircraft. Examples include a distance the aircraft is scheduled to travel to a subsequent destination after the current aircraft landing facility, a charging capability of the current aircraft landing facility, a charging capability of the subsequent aircraft landing facility, a route and/or travel duration that the aircraft is scheduled to travel between the current aircraft landing facility and the subsequent aircraft landing facility, a desired duration at the current aircraft landing facility, a desired duration at the subsequent aircraft landing facility, and/or include current and/or predicted weather along the scheduled route of the aircraft.

As another example, the transportation itinerary data can include an available and/or scheduled downtime of the aircraft. An aircraft that is scheduled for longer downtime (e.g., compared with other aircraft in need of charging) can be paired with a robotic charging device that has slower charging capabilities (e.g., as compared with other available robotic charging devices) and/or with fewer robotic charging devices. As an example, if the aircraft is dropping off and/or picking up a small number of passengers (according to the transportation itinerary data), a robotic charging device having highspeed charging capabilities can be assigned to the aircraft to minimize delay in light of a short anticipated downtime. Conversely, if the aircraft is not scheduled to depart again soon according to the transportation itinerary, a slow speed robotic charging device can be assigned to the aircraft. In such an example, robotic charging devices having highspeed charging capabilities can be reserved for other aircraft. Thus, the robotic charging device can be selected from the plurality of robotic charging devices based on transportation itinerary data associated with the aircraft's past, current, and/or future destinations.

Additional examples of transportation itinerary data include data associated with one or more future scheduled trips (e.g., after a scheduled immediate subsequent trip). For instance, if an aircraft is scheduled to have a short flight to a subsequent destination at which the aircraft will pick up a large number of passengers, the aircraft may be more fully charged before the short trip to be better equipped for the future scheduled trip with the large number of passengers. As another example, a travel time to a nearest aircraft landing facility that has suitable charging infrastructure. For example, the nearest aircraft landing facility having suitable charging infrastructure can be defined as having minimal charging capabilities, such as charging time (for a particular aircraft), charging current, charging voltage, and/or charging compatibility (e.g, with a charging port of the aircraft). For instance, if the current aircraft landing facility cannot charge the aircraft or cannot charge the aircraft in accordance with one or more desired criteria (such as charging time, current, voltage, etc.), the nearest aircraft landing facility having suitable charging infrastructure can be considered when pairing a robotic charging device with the aircraft.

The energy parameter(s) of the aircraft can include a current charge state, a total energy capacity, a charging voltage requirement, a charging current requirement, a typical energy consumption rate of the aircraft when flying, and/or any other suitable characteristics of the battery or batteries of the aircraft, electric motors of the aircraft, and/or other components of an electrical system of the aircraft.

The operations can further include determining one or more charging parameters for the robotic charging device based at least in part on the data associated with the transportation itinerary. The charging parameter(s) can describe and/or be indicative of charging duration, a current charge state of the aircraft, a target final charge state of the aircraft, a total amount of energy to be delivered to the aircraft, a charging voltage, and/or a charging current for the aircraft. Example charging parameter(s) can include a current aircraft charge level, predicted and/or future charge level of the aircraft (e.g., upon arrival at the subsequent aircraft landing facility, when the aircraft is scheduled to depart the current aircraft landing facility), data describing an aircraft energy infrastructure (e.g., hardware and/or electrical components required to charge the vehicle, and/or an energy efficiency of batteries of the aircraft). The target final charge state of the aircraft can include a total energy stored in the batter of the aircraft, which can be defined in terms of units of energy (e.g., Joules), hours of normal flight time for the aircraft, or any other suitable metric.

The charging parameter(s) can be determined based on the data associated with the transportation itinerary, (e.g., as described above with respect to determining and/or selecting a particular robotic charging device from the plurality of robotic charging devices) and/or the energy parameter(s) of the aircraft. The charging parameter(s) can include a total charging energy, charging voltage, charging current, charging time, and the like required for the aircraft. For example, the charging parameters can be determined based on a current charge level of the battery of aircraft, a weight of the aircraft, a battery configuration of the aircraft, a motor configuration of the aircraft, a number and/or weight of passengers aboard, a weight of cargo aboard, a distance to a subsequent destination, weather, and any other suitable factor that affects the amount of battery energy needed for the subsequent trip. The charging parameter(s) can describe characteristics of a suitable charging procedure for charging the particular aircraft for subsequent use in a ridesharing service.

The operations can further include communicating one or more command instructions for the selected robotic charging device to charge the aircraft in accordance with charging parameter(s). The robotic charging device can be configured to automatically connect with a charging area (e.g., wirelessly or via wired connection) of the aircraft for charging a battery onboard the aircraft based on the command instruction(s). The robotic charging device can receive the command instructions directly or can receive data descriptive of the command instructions (e.g., directly or via one or more intermediary computing devices). Thus, the computing system can communicate the command instruction(s) for the robotic charging device to charge the aircraft according to the charging parameter(s).

The command instruction(s) can include and/or describe a variety of information and/or instructions. Examples include an identity of an aircraft to be charged and/or a location of the aircraft to be charged. The location of the aircraft can be described as an identity of a landing pad at the aircraft landing facility and/or a set of location coordinates defined with respect to a landing pad, a landing area including one or more landing pads, the aircraft landing facility, global positioning coordinates, or any other suitable data that describes the location of the aircraft. The command instruction(s) can describe one or more charging parameters, for example as described above such that the robotic charging device can charge the aircraft according to the charging parameters.

Aspects of the present disclosure are directed to coordinating charging for a plurality of aircraft (e.g., a fleet), for example that is provided as a part of a rideshare service. The fleet of aircraft can include aircraft having different characteristics, models, types, and the like. For example, different aircraft within the fleet can have different battery configurations, charging port types, power demands, charging capabilities, weights, and the like. The battery configurations can vary according to energy capacity, number of cells, required charging voltage, required charging current, and so forth.

A variety of robotic charging devices can be employed (e.g., at a single landing facility) within the scope of the present disclosure. For example, the robotic charging devices can be stationary or mobile. A stationary robotic charging device can include a robotic arm having an end that is stationary with respect to a surface on which the aircraft is positioned (e.g., a landing surface, parking surface, etc.). For example, the end of the robotic arm can be mounted, tethered, coupled or the like to the surface of a structure coupled to the surface (e.g., a covering, a support structure of a covering, or the like). The robotic arm can be configured to automatically operatively connect with a charging area (e.g., a charging port or wireless charging area) of the aircraft and charge one or more batteries onboard the aircraft. Alternatively, the robotic charging device can be mobile (e.g., on tracks or wheels). The robotic charging device can travel (e.g., via self-locomotion) to the aircraft (e.g., after it lands). The robotic charging device can automatically operatively connect with a charging area (e.g., charging port, wireless charging area) of the aircraft and charge the battery or batteries onboard the aircraft. Thus, mobile and/or stationary robotic charging device(s) can be used to automatically charge one or more aircraft, for example, at a charging facility.

Additionally, some robotic charging devices can be equipped for fast charging while others are equipped for slow or normal speed charging. The robotic charging devices can have various compatibilities with aircraft, for example because of charging port type, charging port location (e.g., height from the ground), and/or battery demands (e.g., charging current, voltage, etc.). However, robotic charging devices that are universal or agnostic with respect to aircraft types (e.g., charging port types) are also considered within the scope of this disclosure.

As indicated above, the respective robotic charging devices can be assigned or paired with respective aircraft based on data about the robotic charging device(s). As one example, the aircraft can be paired with a robotic charging device based on the robotic charging device's compatibility with the charging port type. As another example, an aircraft with a particularly low charge state can be paired with a robotic charging device that is configured for rapid charging (e.g., as compared with other available robotic charging devices) and/or with multiple robotic charging devices for faster charging.

The robotic charging devices can have a variety of charging configurations. For instance, in some implementations, a power cable or tether can connect the mobile robotic charging device to a power source. The power source can supply the mobile robotic charging device with power via the power cable for operating the mobile robotic charging device and/or for charging the battery onboard the aircraft. In other implementations, however, the mobile robotic charging device can be free of electrical connection with an external power source. For example, the mobile robotic charging device can include a battery or other power source onboard the mobile robotic charging device. The mobile robotic charging device can charge its own battery at a docking station while the mobile robotic charging device is not in use. The mobile robotic charging device can be configured to disconnect from the docking station when needed to charge an aircraft. The mobile robotic charging device can be configured to automatically dock at the docking station when the battery of the mobile robotic charging device needs charging.

Aspects of the present disclosure are directed to detecting and/or monitoring battery charge level and/or battery health of batteries aboard aircraft. For example, the computing system can be configured to determine an initial charge state of the battery onboard on the aircraft, a charge energy delivered to the battery onboard the aircraft (e.g., by the robotic charging devices), and/or a final charge state of the battery onboard the aircraft. This information can be used to determine information about how well the battery onboard the aircraft is functioning, which can be referred to as a "health state" of the battery.

The initial charge state of the battery can be determined in a variety of manners. For example, the aircraft can be configured to sense or detect a voltage, current, or the like that is indicative of the charge level of the onboard battery. The charge level can be communicated by a computing device of the aircraft, for example, while the aircraft is still in flight and approaching the landing facility and/or communicated after the aircraft has landed. As another example, the initial charge level can be detected by the robotic charging device once it is operatively connected with a charging area (e.g., charging port, wireless charging area) of the aircraft. The charge level can be detected by sensing a voltage, current, or the like of the battery and correlating the voltage with a charge level based on characteristics of the battery. After charging is complete, the final charge state of the battery onboard the aircraft can similarly be measured. The final charge state can similarly be measured by the robotic charging device and/or by the aircraft and communicated (e.g., to the computing system, robotic charging device, a cloud computing service/server, or the like).

A charge energy delivered to the battery onboard the aircraft (e.g., by the robotic charging devices) can be determined from measured characteristics of the charging session. The charge energy can be defined as the total number of units of energy (e.g., Joules, Watt-hours, etc.) applied to the battery during the charging session. Example characteristics of the charging session can include, for example, time, current, voltage, and/or current of the charging session.

The difference between the final charge state and the initial charge state can be compared with the charge energy delivered to the battery to determine information about the battery, such as battery health. For example, a determination that the final charge state is less than a predicted final charge state, can indicate poor battery health as the battery may not retaining all the energy that is transmitted and/or applied to the battery. Similarly, if the final charge state is greater than the predicted final charge state, the battery may be malfunctioning at the initial charge state and potentially other lower charge states, which can also indicate poor battery health. In contrast, if the computing system determines that the final charge state is approximately equal to an expected charge, the computing system can determine that the battery is functioning properly e.g., has good battery health. The computing system can be configured to calculate a battery health score, or other metric, based on at least one of initial charge state, final charge state, or charge energy.

The computing system described herein can include a variety of sub-systems and/or computing devices. For example, the computing system can include a cloud services system that can operate to control, route, monitor, and/or communicate with the aircraft (e.g., VTOL aircraft). These operations can be performed as part of a multi-modal transportation service for passengers, for example, including travel by ground vehicle and travel by VTOL aircraft.

The cloud services system can be communicatively connected over a network to one or more rider computing devices, one or more service provider computing devices for a first transportation modality, one or more service provider computing devices for a second transportation modality, one or more service provider computing devices for an Nth transportation modality, and one or more infrastructure and operations computing devices.

Each of the computing devices can include any type of computing device such as a smartphone, tablet, hand-held computing device, wearable computing device, embedded computing device, navigational computing device, vehicle computing device, etc. A computing device can include one or more processors and a memory. Although service provider devices are shown for N different transportation modalities, any number of different transportation modalities can be used, including, for example, less than the three illustrated modalities (e.g., one or more modalities can be used).

The cloud services system includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage media, such as RAM, ROM, EEPROM, EPROM, one or more memory devices, flash memory devices, etc., and combinations thereof.

The memory can store information that can be accessed by the one or more processors. For instance, the memory (e.g., one or more non-transitory computer-readable storage mediums, memory devices) can store data that can be obtained, received, accessed, written, manipulated, created, and/or stored. In some implementations, the cloud services system can obtain data from one or more memory device(s) that are remote from the system.

The memory can also store computer-readable instructions that can be executed by the one or more processors. The instructions can be software written in any suitable programming language or can be implemented in hardware. Additionally or alternatively, the instructions can be executed in logically and/or virtually separate threads on processor(s). For example, the memory can store instructions that when executed by the one or more processors cause the one or more processors to perform any of the operations and/or functions described herein.

The computing system can include an aircraft navigation system. The aircraft navigation system can include one or more processors, memory, and a network interface, for example as described above with reference to the processors, memory, and network interface. The memory can include data and instructions, for example as described above with reference to the data and instructions of memory.

The computing system can include a landing facility computing system. The landing facility computing system can be included in the cloud services system and/or one or more functions/systems of the cloud services computing system can be included in the landing facility computing system. The landing facility computing system can include one or more processors, memory, and a network interface, for example as described above with reference to the processors, memory, and network interface. The memory can include data and instructions, for example as described above with reference to the data and instructions of memory.

The cloud services system can include a number of different systems such as a world state system, a forecasting system, an optimization/planning system, and a matching and fulfillment system. The matching and fulfillment system can include a different matching system for each transportation modality and a monitoring and mitigation system. Each of the systems can be implemented in software, firmware, and/or hardware, including, for example, as software which, when executed by the processors cause the cloud services system to perform desired operations. The systems can cooperatively interoperate (e.g., including supplying information to each other).

The world state system can operate to maintain data descriptive of a current state of the world. For example, the world state system can generate, collect, and/or maintain data descriptive of predicted passenger demand; predicted service provider supply; predicted weather conditions; planned itineraries; pre-determined transportation plans (e.g., flight plans) and assignments; current requests; current ground transportation service providers; current transportation node operational statuses (e.g., including re-charging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system can obtain such world state information through communication with some or all of the devices. For example, devices can provide current information about passengers while devices can provide current information about service providers. Devices can provide current information about the status of infrastructure and associated operations/management.

The forecasting system can generate predictions of the demand and supply for transportation services at or between various locations over time. The forecasting system can also generate or supply weather forecasts. The forecasts made by the system can be generated based on historical data and/or through modeling of supply and demand. In some instances, the forecasting system can be referred to as an RMR system, where RMR refers to "routing, matching, and recharging." The RMR system can be able to simulate the behavior of a full day of activity across multiple ride share networks.

The optimization/planning system can generate transportation plans for various transportation assets and/or can generate itineraries for passengers. For example, the optimization/planning system can perform flight planning. As another example, optimization/planning system can plan or manage/optimize itineraries which include interactions between passengers and service providers across multiple modes of transportation.

The matching and fulfillment system can match a passenger with a service provider for each of the different transportation modalities. For example, each respective matching system can communicate with the corresponding service provider computing devices via one or more APIs or connections. Each matching system can communicate trajectories and/or assignments to the corresponding service providers. Thus, the matching and fulfillment system can perform or handle assignment of ground transportation, flight trajectories, take-off/landing, etc.

The monitoring and mitigation system can perform monitoring of user itineraries and can perform mitigation when an itinerary is subject to significant delay (e.g., one of the legs fails to succeed). Thus, the monitoring and mitigation system can perform situation awareness, advisories, adjustments and the like. The monitoring and mitigation system can trigger alerts and actions sent to the devices. For example, passengers, service providers, and/or operations personnel can be alerted when a certain transportation plan has been modified and can be provided with an updated plan/course of action. Thus, the monitoring and mitigation system can have additional control over the movement of aircraft, ground vehicles, pilots, and passengers.

In some implementations, the cloud services system can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices can be associated with autonomous vehicles (e.g., autonomous VTOL aircraft). Thus, the service provider computing devices can provide communication between the cloud services system and an autonomy stack of the autonomous vehicle which autonomously controls motion of the autonomous vehicles.

The infrastructure and operations computing devices can be any form of computing device used by or at the infrastructure or operations personnel including, for example, devices configured to perform passenger security checks, luggage check in/out, re-charging/re-fueling, safety briefings, vehicle check in/out, and/or the like.

The network(s) can be any type of network or combination of networks that allows for communication between devices. In some embodiments, the network(s) can include at least one of a local area network, wide area network, the Internet, secure network, cellular network, mesh network, peer-to-peer communication link and/or some combination thereof and can include any number of wired or wireless links. Communication over the network(s) can be accomplished, for instance, via a network interface using any type of protocol, protection scheme, encoding, format, packaging, etc.

Example aspects of the present disclosure can provide a number of technical effects and benefits. For example, automatically charging aircraft can reduce downtime and thus improve overall efficiency of the system. More specifically, determining a robotic charging device from among a plurality of robotic charging devices for charging the aircraft while at the aircraft landing facility based at least in part on the data associated with the transportation itinerary and the energy parameter(s) of the aircraft can facilitate intelligent matching of robotic charging devices with aircraft that need to be charged. Such intelligent pairing can reduce aircraft downtime, passenger delay, and generally improve the efficiency of a rideshare service provided with the aircraft.

Additionally, one or more charging parameters can be determined for the robotic charging device based at least in part on the data associated with the transportation itinerary. As such, the charging parameters can be determined in a manner that more efficiently provides the aircraft with the necessary charging energy, current, voltage and the like. As such, determining the charging parameter(s) can similarly reduce aircraft downtime, passenger delay, and generally improve the efficiency of the rideshare service provided with the aircraft. Furthermore, determining the charging parameter(s) can ensure that the aircraft are provided with appropriately conditioned electrical current, voltage, and so forth to protect the batteries of the aircraft from damage.

With reference now to the Figures, example embodiments of the present disclosure will be discussed in further detail.

Example Embodiments

FIG. 1 depicts a block diagram of an example system 100 according to example embodiments of the present disclosure. The system 100 can include a cloud services system 102 that can operate to control, route, monitor, and/or communicate with aircraft (e.g., VTOL aircraft). These operations can be performed as part of a multi-modal transportation service for passengers, for example, including travel by ground vehicle and travel by aircraft (e.g., VTOL aircraft).

The cloud services system 102 can be communicatively connected over a network 180 to one or more rider computing devices 140, one or more service provider computing devices 150 for a first transportation modality, one or more service provider computing devices 160 for a second transportation modality, one or more service provider computing devices 170 for an Nth transportation modality, and one or more infrastructure and operations computing devices 190.

Each of the computing devices 140, 150, 160, 170, 190 can include any type of computing device such as a smartphone, tablet, hand-held computing device, wearable computing device, embedded computing device, navigational computing device, vehicle computing device, etc. A computing device can include one or more processors and a memory (e.g., similar to as will be discussed with reference to processors 112 and memory 114). Although service provider devices are shown for N different transportation modalities, any number of different transportation modalities can be used, including, for example, less than the three illustrated modalities (e.g., one or more modalities can be used).

The cloud services system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the cloud services system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

The computing system 100 can include an aircraft navigation system 142. The aircraft navigation system 142 can include one or more processors 143, memory 144, and a network interface 147, for example as described above with reference to the processors 112, memory 114, and network interface 124. The memory 144 can include data 145 and instructions 146, for example as described above with reference to the data 116 and instructions 118 of memory 114.

The computing system 100 can include a landing facility computing system 152. The landing facility computing system 152 can be included in the cloud services system 102 and/or one or more functions/systems of the cloud services computing system 102 can be included in the landing facility computing system 152. The landing facility computing system 152 can include one or more processors 153, memory 154, and a network interface 157, for example as described above with reference to the processors 112, memory 114, and network interface 124. The memory 154 can include data 155 and instructions 156, for example as described above with reference to the data 116 and instructions 118 of memory 114.

The cloud services system 102 can include a number of different systems such as a world state system 126, a forecasting system 128, an optimization/planning system 130, and a matching and fulfillment system 132. The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the cloud services system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted passenger demand; predicted service provider supply; predicted weather conditions; planned itineraries; pre-determined transportation plans (e.g., flight plans) and assignments; current requests; current ground transportation service providers; current transportation node operational statuses (e.g., including re-charging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the devices 140, 150, 160, 170, 190. For example, devices 140 can provide current information about passengers while devices 150, 160, and 170 can provide current information about service providers. Devices 190 can provide current information about the status of infrastructure and associated operations/management.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple ride share networks.

The optimization/planning system 130 can generate transportation plans for various transportation assets and/or can generate itineraries for passengers. For example, the optimization/planning system 130 can perform flight planning. As another example, optimization/planning system 130 can plan or manage/optimize itineraries which include interactions between passengers and service providers across multiple modes of transportation.

The matching and fulfillment system 132 can match a passenger with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation, flight trajectories, take-off/landing, etc.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments and the like. The monitoring and mitigation system 136 can trigger alerts and actions sent to the devices 140, 150, 160, 170, and 190. For example, passengers, service providers, and/or operations personnel can be alerted when a certain transportation plan has been modified and can be provided with an updated plan/course of action. Thus, the monitoring and mitigation system 136 can have additional control over the movement of aircraft, ground vehicles, pilots, and passengers.

In some implementations, the cloud services system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150, 160, 170 can be associated with autonomous vehicles (e.g., autonomous VTOL aircraft). Thus, the service provider computing devices 150, 160, 170 can provide communication between the cloud services system 102 and an autonomy stack of the autonomous vehicle which autonomously controls motion of the autonomous vehicles.

The infrastructure and operations computing devices 190 can be any form of computing device used by or at the infrastructure or operations personnel including, for example, devices configured to perform passenger security checks, luggage check in/out, re-charging/re-fueling, safety briefings, vehicle check in/out, and/or the like.

In some embodiments, the system 100 can include one or more robotic charging device 192. Each robotic charging device 192 can include one or more processors 193, memory 194, and a network interface 197, for example as described above with reference to the processors 112, memory 114, and network interface 124. The memory 194 can include data 195 and instructions 196, for example as described above with reference to the data 116 and instructions 118 of memory 114.

The system 100 can be configured to facilitate charging (e.g., automatic charging) of an aircraft. For example, the aircraft navigation system 142, the landing facility computing system 152, and/or a computing system of the robotic charging device 195 (e.g., processor(s) 193 and memory 194) can be configured to perform one or more operations described herein, for example as described below with reference to FIGS. 4 through 6.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
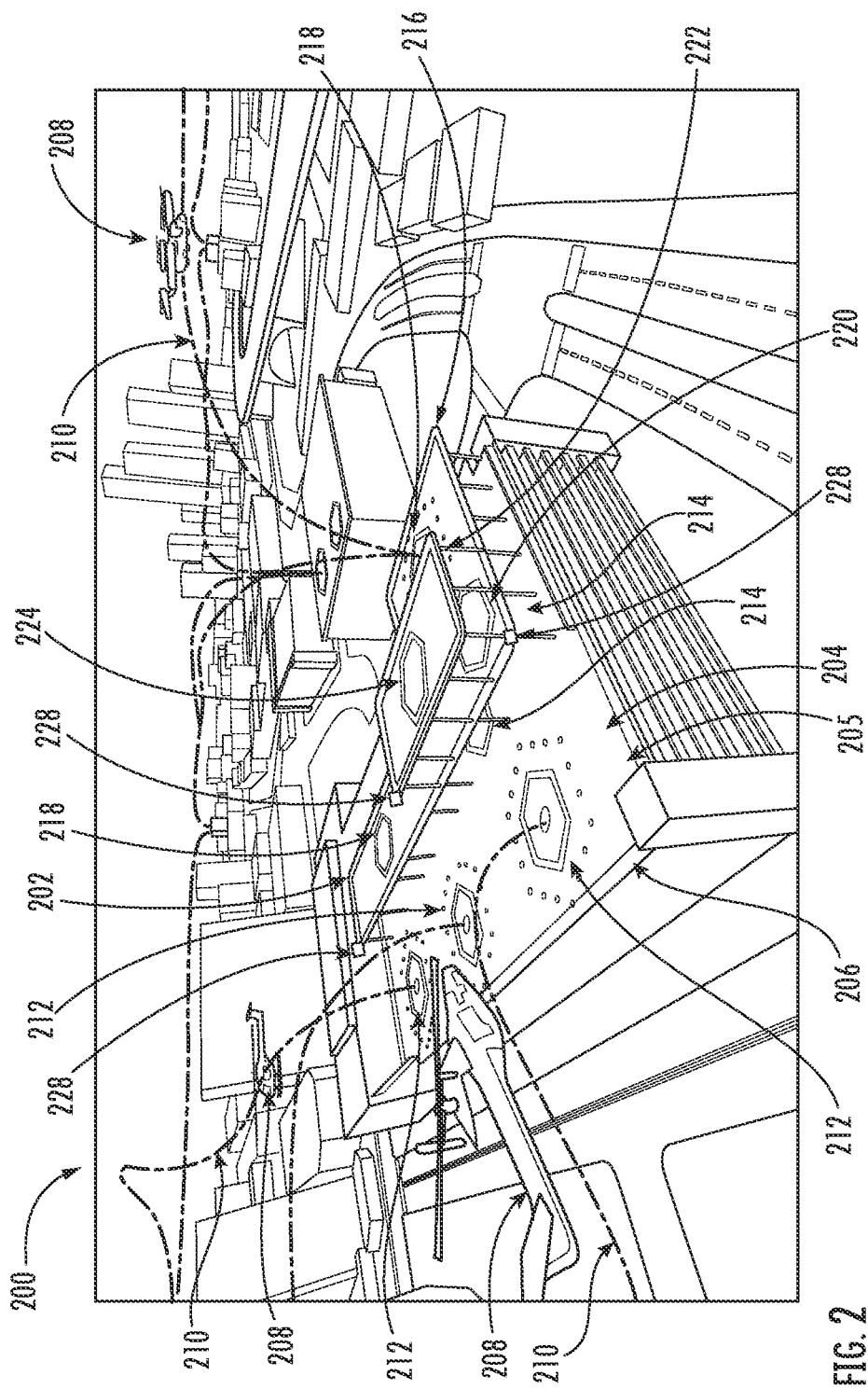
FIG. 2 is a perspective view of one embodiment of an aircraft landing and charging facility according to aspects of the present disclosure.

FIG. 2 illustrates an example embodiment of portions of a system 200 in an urban environment according to aspects of the present disclosure. The system can include or be implemented with an aircraft landing facility 202. The aircraft landing facility 202 may be located on a roof 204 of a structure 206, such as a parking garage. The aircraft landing facility 202 may provide landing and/or take-off locations for one or more VTOL aircraft 208.

The aircraft landing facility 202 can include a lower level 205, which may include the roof 204 of the structure 206 and/or a platform supported on the roof 204 of the structure 206. The lower level 205 can include a lower landing area including one or more landing locations 212 and a storage area that includes one or more lower storage locations 214. The aircraft landing facility 202 can include an upper level 216 that is supported over at least a portion of the lower level 205. For example, the upper level 216 can be located over one or more of the lower storage locations 214. The upper level 216 can have one or more upper landing locations 218 within an upper landing area and one or more storage locations 220 within an upper storage area. An additional level 222 may be arranged over the storage location(s) 220 of the upper level 216. The additional level 222 may include an emergency landing location 224 within an emergency landing area 226. However, it should be understood that, in some embodiments, the aircraft landing facility 202 may be free of any additional levels above the upper level 216.

A computing system, for example as described with reference to FIG. 1, can be configured to control, route, monitor, and/or communicate with VTOL aircraft in the vicinity of the aircraft landing facility 202, for example as described herein. The computing system can be configured to determine or aid in determining respective routes 210 for the VTOL aircraft 208 for landing on the aircraft landing facility 202 and/or taking-off from the aircraft landing facility 202. The computing system can determine respective landing pad locations on which the VTOL aircraft 208 can land.

In some embodiments, one or more sensors 228 can be configured to detect a location of the VTOL aircraft 208 relative to the landing pad location (e.g., during approach, landing, taxing, or storage). For example, a portion of the computing system (e.g., a landing facility computing system located at the aircraft landing facility 200) can be operatively connected with the sensor(s) 228 and configured to detect the presence and/or location of VTOL aircraft 208 within the landing areas, within the storage areas, during approach and/or during takeoff. The sensors 228 can be any suitable type of sensor including optical, infrared, heat, radar, LIDAR, pressure, capacitive, inductive, etc. As illustrated, the sensors 228 can be mounted on the upper level 216 or additional level 222. However, in other embodiments, the sensors 228 can be mounted within the lower level 302 (shown in FIG. 3) and/or upper level 216, for example as capacitive sensors to detect the presence/location of the VTOL aircraft 208 in the lower level 302 and/or upper level.

Figure 3:
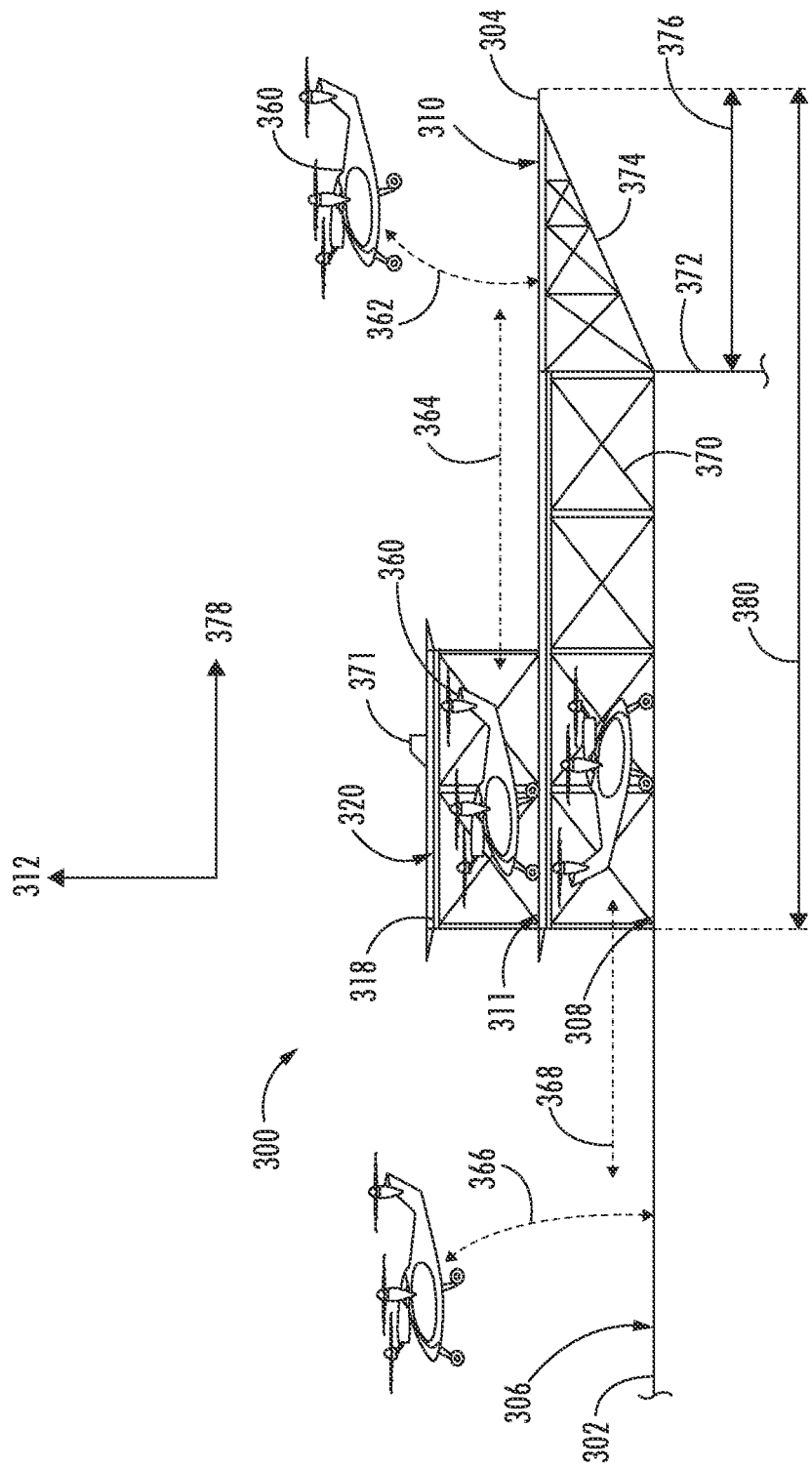
FIG. 3 is a side elevation view of the aircraft landing and charging facility of FIGS. 3 and 4 that schematically illustrates landing and takeoff of VTOL aircraft according to aspects of the present disclosure.

FIG. 3 schematically illustrates a first VTOL aircraft 360 landing (as represented by dotted arrow 362) on the upper landing area 310 of the upper level 304. The first VTOL aircraft 360 can then be moved from the upper landing area 310 to the upper storage area 311 (as represented by dotted arrow 364). The process can be reversed for the first VTOL aircraft 360 to take off from the upper landing area 310. Similarly, a second VTOL aircraft 366 can land (as represented by dotted arrow 366) on the lower landing area 306 of the lower level 302. The second VTOL aircraft 366 can then be moved from the lower landing area 306 to the lower storage area 308 (as represented by dotted arrow 368).

In some embodiments, the computing system can be configured to manage multiple VTOL aircraft concurrently, simultaneously, or near simultaneously. For example, the computing system can manage landing and/or takeoff of two VTOL aircraft at the same time (e.g., on the same level or on different levels). As another example, the computing system can determine the landing pad location based on the presence of recently landed VTOL aircraft. The computing system can maintain a minimum safety distance (e.g., 200 feet, etc.) between the VTOL aircraft during takeoff and landing as required by applicable regulations.

Figure 4:
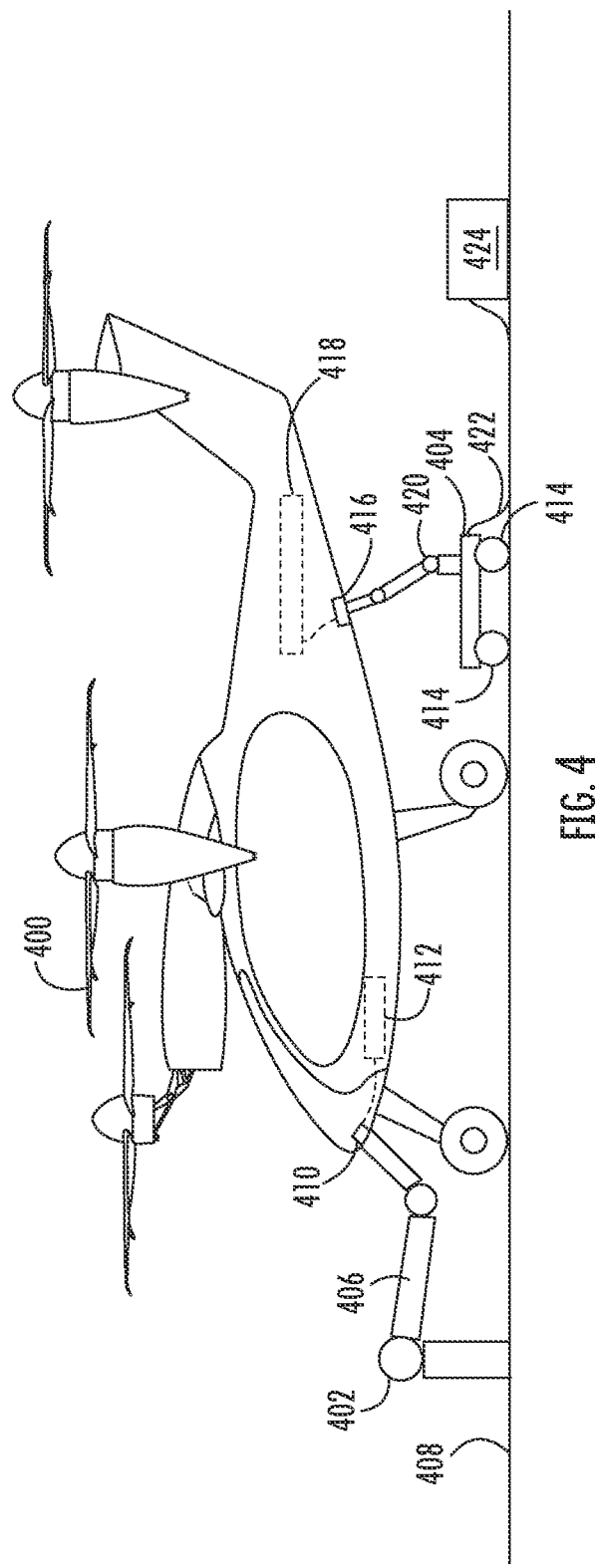
FIG. 4 depicts a VTOL aircraft being charged by a stationary robotic charging device and a mobile robotic charging device according to aspects of the present disclosure.

FIG. 4 depicts a VTOL aircraft 400 being charged by a stationary robotic charging device 402 and a mobile robotic charging device 404 according to aspects of the present disclosure. The robotic charging devices 402, 404 can correspond with the robotic charging device(s) 192 of FIG. 1. The robotic charging devices 402, 404 can be configured to automatically connect with the VTOL aircraft 400 (e.g., wireless or by wired connection) and initiating charging of the VTOL aircraft 400, thereby reducing downtime between flights and improve overall system efficiency. Aspects of the present disclosure are also directed to intelligently pairing VTOL aircraft 400 (or other types of aircraft) that need charging (e.g., as they approach the aircraft landing facility) with robotic charging devices 402, 404 that are available to charge the aircraft 400.

A stationary robotic charging device 402 can include a robotic charging arm 406 having one end 407 that is stationary with respect to a surface 408 on which the aircraft 400 is positioned. For example, the stationary robotic charging device 402 can be coupled (e.g., mounted, tethered, etc.) to a surface 408 on which the aircraft 400 is positioned (e.g., a landing surface, parking surface, etc.). Alternatively, the robotic charging arm 406 can be coupled to a structure that is stationary with respect to the surface on which the aircraft 400 is positioned (e.g., coupled to a roof, covering, and/or support thereof). The robotic arm 406 can be configured to automatically connect with a charging port 410 of the aircraft 400 and charge one or more batteries 412 onboard the aircraft 400.

The mobile robotic charging device 404 can be mobile (e.g., on tracks or wheels 414). The mobile robotic charging device 404 can be configured to travel to the aircraft 400 (e.g., after the aircraft 400 lands). For example, the mobile robotic charging device 404 can be configured to autonomously navigate the landing facility to the aircraft 400. The mobile robotic charging device 404 can automatically connect with another charging port 416 of the aircraft 40 and charge a battery 418 onboard the aircraft 400. For example, the mobile robotic charging device 404 can include a robotic arm 420 configured to couple with the additional charging port 416. Thus, the mobile robotic charging device(s) can be used to automatically charge one or more aircraft.

In some implementations, a power cable 422 or tether can connect the mobile robotic charging device 404 to a power source 424. The power source 424 can supply the mobile robotic charging device 404 with power via the power cable 422 for operating the mobile robotic charging device 404 and/or for charging the battery 418 onboard the aircraft 400. In other implementations, however, the mobile robotic charging device 404 can be free of electrical connection with an external power source 424. For example, the mobile robotic charging device 404 can include a battery or other power source onboard the mobile robotic charging device 404. The mobile robotic charging device 404 can charge its own battery at a docking station while the mobile robotic charging device 404 is not in use. The mobile robotic charging device 404 can be configured to disconnect from the docking station when needed to charge the aircraft 400. The mobile robotic charging device 404 can be configured to automatically dock at the docking station when the battery of the mobile robotic charging device 404 needs charging. The robotic charging device 404 can be configured to implement wired and/or wireless charging techniques.

The robotic charging devices 402, 404 can have a variety of different configurations. For example, some of the robotic charging devices 402, 404 can be equipped for fast charging while others are equipped for slow or normal speed charging. The robotic charging devices 402, 404 can have various compatibilities with aircraft, for example because of charging port type, charging port location (e.g., height from the ground), and/or battery demands (e.g., charging current, voltage, etc.). However, robotic charging devices that are universal or agnostic with respect to aircraft types (e.g., charging port types) are also considered within the scope of this disclosure.

Figure 5:
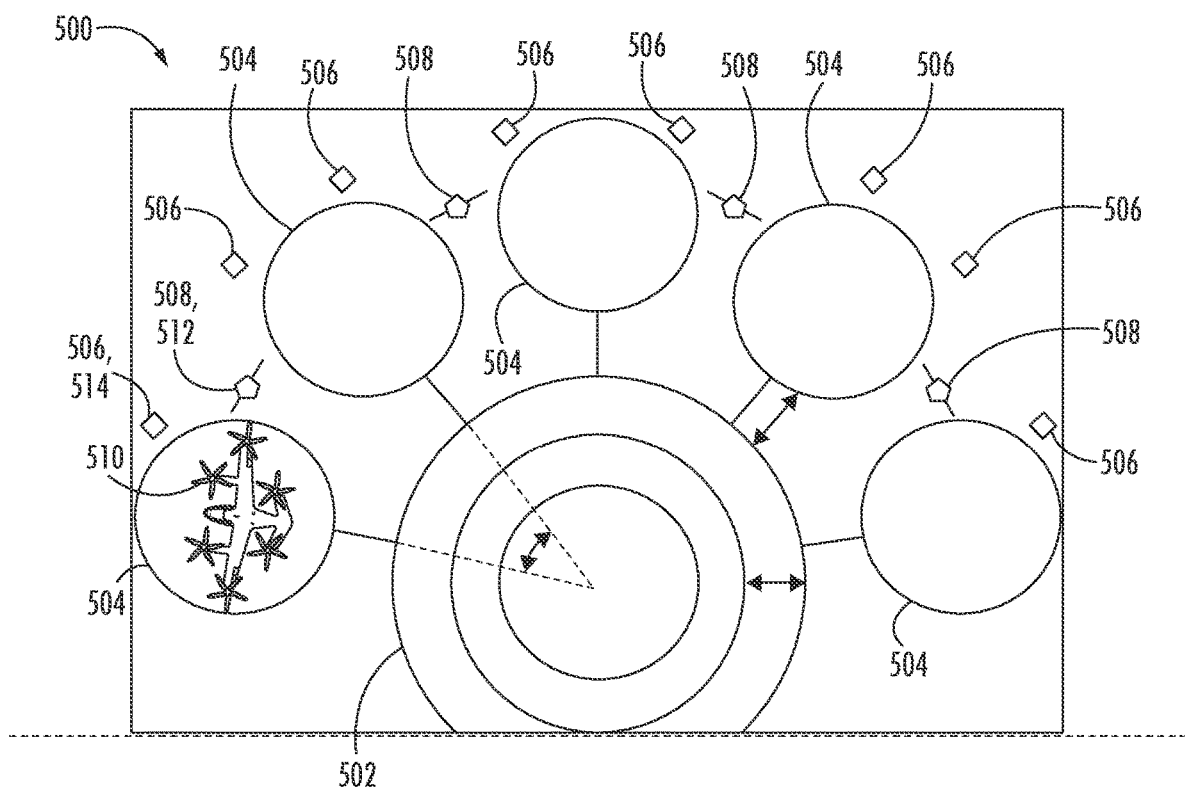
FIG. 5 depicts a top down view of a landing and charging area of an aircraft landing facility according to aspects of the present disclosure.

FIG. 5 depicts a top down view of a landing and charging area of an aircraft landing facility 500 according to aspects of the present disclosure. In some implementations, a fleet of robotic charging devices can be configured to service multiple aircraft, for example shortly after the aircraft land at the landing facility. The landing and charging facility 500 can include a landing area 502, one or more parking/charging area 504 and/or one or more charging devices such as robotic charging devices 506, 508 and/or power sources. For example, the landing and charging facility 500 can include one or more stationary charging devices 506 and/or one or more mobile charging devices 508.

The computing system (e.g., the landing facility computing system 152, cloud services system 102, and/or a computing system of the robotic charging device 192) can be configured to assign respective robotic charging devices 506, 508 (e.g., from the available robotic charging devices 506, 508) to aircraft 510 in need of charging (e.g., as the aircraft 510 approaches the landing facility 500, after the aircraft 510 have landed, etc.) The robotic charging devices 506, 508 can be assigned to or paired with the aircraft 510 based on a variety of factors including data associated with a transportation itinerary of the aircraft 510 and/or one or more energy parameters of the aircraft 510. For instance, the computing system can obtain the data from the aircraft 510 (e.g., as the aircraft 510 approaches the landing area 502 and/or charging facility 500). The computing system can determine (e.g., select) a robotic charging device 512 from among a plurality of robotic charging devices 506, 508 for charging the aircraft while at the aircraft landing facility 500 based on the data associated with the transportation itinerary of the aircraft 510 and/or one or more energy parameters of the aircraft 510. The data associated with the transportation itinerary of the aircraft can describe various characteristics of passengers and/or cargo aboard the aircraft (e.g., number, weight, etc.), the aircraft's origination location, the aircraft landing facility that the aircraft is approaching or on which the aircraft is currently landed, and/or a subsequent destination of the aircraft, for example as described below with reference to FIG. 6.

The computing system can determine one or more charging parameters for the robotic charging device 512 based at least in part on the data associated with the transportation itinerary and/or energy parameter(s) of the aircraft 510. The computing system can communicate command instruction(s) for the robotic charging device 512 to charge the aircraft 510 in accordance with the one or more charging parameters. The robotic charging device 512 can be configured to automatically connect with a charging area of the aircraft 510 for charging a battery onboard the aircraft 510. Such intelligent pairing of robotic charging devices 506, 508 and aircraft 510 can reduce aircraft downtime, reduce passenger delay, and/or improve safety.

A variety of robotic charging devices 506, 508 can be employed (e.g., at a single landing facility 500) within the scope of the present disclosure. As indicated above, the respective robotic charging devices 506, 508 can be determined (e.g., selected for assignment to the aircraft 510) based on data associated with the transportation itinerary of the aircraft 510 and/or energy parameter(s) of the aircraft 510.

Additionally, in some implementations, the robotic charging devices 506, 508 can be determined (e.g., selected for assignment to the aircraft 510) based on data that describes the the robotic charging device(s) 506, 508. Example data includes charging capability (e.g., energy delivery capacity, voltage capacity, current capacity, etc.), type (e.g., mobile, stationary, etc.), charging port compatibility, and the like. As one example, the aircraft 510 can be paired with one or more of the robotic charging devices 506, 508 based on the compatibility of the particular robotic charging device(s) 512, 514 with the charging port type of the aircraft 510. As another example, aircraft with a particularly low charge state can be paired with a robotic charging device that is configured for rapid charging (e.g., as compared with other available robotic charging devices) and/or with multiple robotic charging devices for faster charging. As a further example, an aircraft that can be scheduled for longer downtime (e.g., compared with other aircraft in need of charging) can be paired with a robotic charging device that has slower charging capabilities (e.g., as compared with other available robotic charging devices) and/or with fewer robotic charging devices 506, 508.

Example Methods

Figure 6:
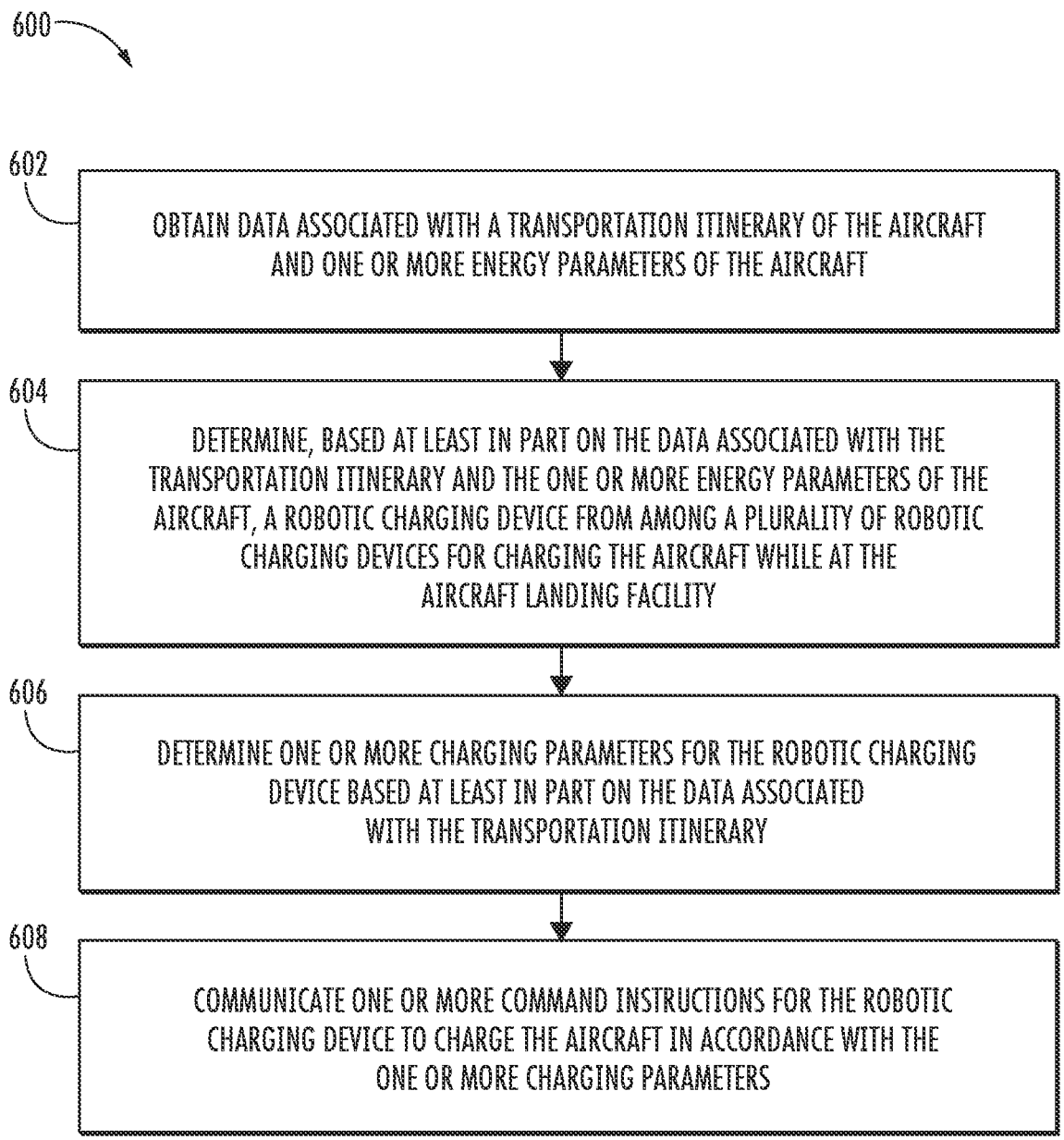
FIG. 6 is a flowchart of a method for charging an aircraft according to aspects of the present disclosure.

FIG. 6 depicts a flow chart diagram of an example method 600 for charging an aircraft. One or more portion(s) of the example method 600 can be implemented by a computing system that includes one or more computing devices such as, for example, the computing systems described with reference to the other figures (e.g., a cloud services system 102, a landing facility computing system 152, a computing system of a robotic charging device 195 (e.g., processor(s) 193 and memory 194) etc.). Each respective portion of the method 600 can be performed by any (or any combination) of one or more computing devices. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of the method 600 can be performed additionally, or alternatively, by other systems.

At 602, the method 600 can include obtaining data associated with a transportation itinerary of the aircraft and one or more energy parameters of the aircraft. The data associated with the transportation itinerary can be indicative of at least an aircraft landing facility at which the aircraft is to be located (e.g., at which the aircraft is approaching for landing). For example, this data can be received at a cloud services system from an aircraft navigation system of the aircraft and/or landing facility computing system. As another example, this data can be received at the landing facility computing system from the aircraft navigation system of the aircraft and/or cloud services system. For instance, the computing system can directly or indirectly receive transportation itinerary and/or data describing energy parameters of the aircraft from the aircraft (e.g., as the aircraft approaches the landing and/or charging facility).

At 604, the method 600 can include determining (e.g., selecting), based at least in part on the data associated with the transportation itinerary and the one or more energy parameters of the aircraft, a robotic charging device from among a plurality of robotic charging devices for charging the aircraft while at the aircraft landing facility. The computing system can intelligently pair aircraft with respective robotic charging devices based on this data (e.g., to more efficiently charge the aircraft as part of a ride share service).

The data associated with the transportation itinerary of the aircraft can include passenger data and/or cargo data with respect to passengers and/or cargo aboard the aircraft. For example, this data can describe a number of passengers currently traveling in the aircraft (e.g., for a rideshare trip), a number of passengers scheduled to travel in the aircraft, and/or a payload weight (e.g., passenger and/or luggage weight) of the aircraft. As further examples, the data associated with the transportation itinerary can describe a number of passengers scheduled to board the aircraft at the current and/or at a subsequent aircraft landing facility. Thus, the robotic charging device can be selected from the plurality of robotic charging devices based on transportation itinerary data that describes various characteristics of the aircraft and/or the passengers aboard the aircraft.

As one example, an aircraft with a large number of passengers aboard (e.g., as compared with other aircraft in need of charging) can be prioritized for mobile robotic charging devices (e.g., that can reach a charging port located away from where the passengers will exit the aircraft) such that the passengers are not encumbered by robotic charging devices as they exit the aircraft. As a further example, the subsequent destination of the aircraft can be used to determine the required range of the aircraft and corresponding battery charge level required. In event that the aircraft will be travelling a shorter distance for its next transportation service, a robotic charger with a slower charging capability or lower battery level may be selected for that aircraft. In the event that the aircraft will be travelling a longer distance for its next transportation service and/or the next facility does not have a charger capable of charging the aircraft, a robotic charger with a faster or more robust charging capability or high battery level may be selected for that aircraft. The number and/or type of robotic charging devices can be selected based on the total charging energy that the aircraft needs.

The data descriptive of the transportation itinerary describe the aircraft, such as a size, a weight, and/or an approach heading of the aircraft. For example, larger aircraft can be difficult to maneuver to a stationary robotic charging device and/or position such that multiple stationary robotic charging devices can connect with the aircraft. Thus, larger aircraft can be paired with mobile robotic charging devices to more easily and/or safely charge the larger aircraft. As another example, an approach heading of an aircraft may align with a landing pad that is equipped with one or more stationary robotic charging devices. This aircraft can be paired with the stationary robotic charging devices at the landing pad that is aligned with its approach heading. Thus, the aircraft can be paired with robotic charging devices based on information about the aircraft, such as size, weight, and approach heading.

For example, if the aircraft is scheduled to travel without any passengers or cargo to subsequent location, the aircraft can be given lower priority for assignment to robotic charging devices. For instance, the aircraft can be assigned a robotic charging device to minimize delay to other aircraft that are carrying passengers and/or cargo. Additionally, such aircraft can be lower priority with respect to landing pad locations (e.g., can be selected for landing pad locations that are farther from an exit, stairway, elevator etc.).

The data associated with the transportation itinerary of the aircraft can describe the aircraft's origination location, the aircraft landing facility that the aircraft is approaching or on which the aircraft is currently landed, and/or a subsequent destination of the aircraft. Examples include a distance the aircraft is scheduled to travel to a subsequent destination after the current aircraft landing facility, a charging capability of the current aircraft landing facility, a charging capability of the subsequent aircraft landing facility, a route and/or travel duration that the aircraft is scheduled to travel between the current aircraft landing facility and the subsequent aircraft landing facility, a desired duration at the current aircraft landing facility, a desired duration at the subsequent aircraft landing facility, and/or include current and/or predicted weather along the scheduled route of the aircraft.

As another example, the transportation itinerary data can include or describe an available and/or scheduled downtime of the aircraft. For example, the transportation itinerary data can include data describing a landing time and take-off time for the aircraft. The scheduled time duration for the aircraft to be located at the aircraft landing facility, or scheduled downtime, can be determined based on the landing time and take-off time. An aircraft that is scheduled for longer downtime (e.g., compared with other aircraft in need of charging) can be paired with a robotic charging device that has slower charging capabilities (e.g., as compared with other available robotic charging devices) and/or with fewer robotic charging devices. As another example, if the aircraft is dropping off and/or picking up a small number of passengers (according to the transportation itinerary data), a robotic charging device having highspeed charging capabilities can be assigned to the aircraft to minimize delay because of a short expected downtime. Conversely, if the aircraft is not scheduled to depart again soon according to the transportation itinerary, a slow speed robotic charging device can be assigned to the aircraft. In such an example, robotic charging devices having highspeed charging capabilities can be reserved for other aircraft. Thus, the robotic charging device can be selected from the plurality of robotic charging devices based on transportation itinerary data associated with the aircraft's past, current, and/or future destinations.

Similarly, aircraft charging order and/or priority can be determined based on the transportation itinerary data, which can include data describing the scheduled downtime of the aircraft. In some embodiments, the aircraft can be ranked or prioritized for charging based on their respective scheduled downtimes, or other information described by the transportation itinerary data. For example, an aircraft scheduled for longer downtime (e.g., compared with other aircraft in need of charging) can be given lower priority for assignment to the robotic charging devices. As a result, one or more other aircraft (e.g., with shorter scheduled downtime) could be charged before one or more aircraft with the longer scheduled downtime. Thus, multiple aircraft can be charged in based on a priority or order that is determined based on the aircrafts' respective scheduled downtime (among other factors).

Additional examples of transportation itinerary data include data associated with one or more future scheduled trips (e.g., after a scheduled immediate subsequent trip). For instance, if an aircraft is scheduled to have a short flight to a subsequent destination at which the aircraft will pick up a large number of passengers, the aircraft may be more fully charged before the short trip to be better equipped for the future scheduled trip with the large number of passengers. As another example, a travel time to a nearest aircraft landing facility that has suitable charging infrastructure. For example, the nearest aircraft landing facility having suitable charging infrastructure can be defined as having minimal charging capabilities, such as charging time (for a particular aircraft), charging current, charging voltage, and/or charging compatibility (e.g., with a charging port of the aircraft). For instance, if the current aircraft landing facility cannot charge the aircraft or cannot charge the aircraft in accordance with one or more desired criteria (such as charging time, current, voltage, etc.), the nearest aircraft landing facility having suitable charging infrastructure can be considered when pairing a robotic charging device with the aircraft.

The energy parameter(s) of the aircraft can include a current charge state, a total energy capacity, a charging voltage requirement, a charging current requirement, a typical energy consumption rate of the aircraft when flying, and/or any other suitable characteristics of the battery or batteries of the aircraft, electric motors of the aircraft, and/or other components of an electrical system of the aircraft.

At 606, the method 600 can include determining one or more charging parameters for the robotic charging device based at least in part on the data associated with the transportation itinerary. The charging parameter(s) can describe and/or be indicative of a charging duration, current charge state of the aircraft, a total amount of energy required to be delivered to the aircraft, a desired charging voltage, and/or a desired charging current for the aircraft. Example charging parameter(s) can include a current aircraft charge level, predicted and/or future charge level of the aircraft (e.g., upon arrival at the subsequent aircraft landing facility, when the aircraft is scheduled to depart the current aircraft landing facility), data describing an aircraft energy infrastructure (hardware and/or electrical components required to charge the vehicle, and/or an energy efficiency of batteries of the aircraft.

The charging parameter(s) can be determined based on the data associated with the transportation itinerary, (e.g., as described above with respect to determining and/or selecting a particular robotic charging device from the plurality of robotic charging devices. The charging parameter(s) can include a total charging energy, charging voltage, charging current, charging time, and the like required for the aircraft. The charging parameters can be determined based on a variety of factors, such as a weight of the aircraft, a battery configuration of the aircraft, an motor configuration of the aircraft, a number and/or weight of passengers aboard, a weight of cargo aboard, a distance to a subsequent destination, weather, and any other suitable factor that affects the amount of battery energy needed for the subsequent trip.

At 608, the method 600 can include communicating one or more command instructions for the robotic charging device to charge the aircraft in accordance with the one or more charging parameters. The robotic charging device can be configured to automatically connect with a charging area of the aircraft for charging a battery onboard the aircraft. The robotic charging device can be configured to automatically connect with a charging area (e.g., wirelessly or via wired connection) of the aircraft for charging a battery onboard the aircraft based on the command instruction(s). The robotic charging device can receive the command instructions directly or can receive data descriptive of the command instructions (e.g., directly or via one or more intermediary computing devices). Thus, the computing system can communicate the command instruction(s) for the robotic charging device to charge the aircraft according to the charging parameter(s).

The command instruction(s) can include and/or describe a variety of information and/or instructions. Examples include an identity of an aircraft to be charged and/or a location of the aircraft to be charged. The location of the aircraft can be described as an identity of a landing pad at the aircraft landing facility and/or a set of location coordinates defined with respect to a landing pad, a landing area including one or more landing pads, the aircraft landing facility, global positioning coordinates, or any other suitable data that describes the location of the aircraft. The command instruction(s) can describe one or more charging parameters, for example as described above such that the robotic charging device can charge the aircraft according to the charging parameters.

The robotic charging device can be configured to automatically operatively connect with a charging area of the aircraft based on the command instructions. For example, the robotic charging device can be coupled to a charging port of the aircraft, for example as described above with reference to FIGS. 4 and 5. As another example, in some embodiments, the robotic charging device can wirelessly charge the aircraft. The robotic charging device can automatically move to a location near the aircraft such that the robotic charging device is able to wirelessly charge a battery of the aircraft. For example, a mobile robotic charging device can automatically move near the wireless charging area aircraft and/or arrange a robotic arm of other feature of the robotic charging device such that a wireless charging area of the robotic charging device is proximate a wireless charging area of the aircraft. The stationary robotic charging device can include a robotic arm having a wireless charging area. The robotic arm can arrange the wireless charging area near the wireless charging area of the aircraft. The wireless charging areas can include one or more inductive coils configured to inductively transmit energy therebetween.

Figure 7:
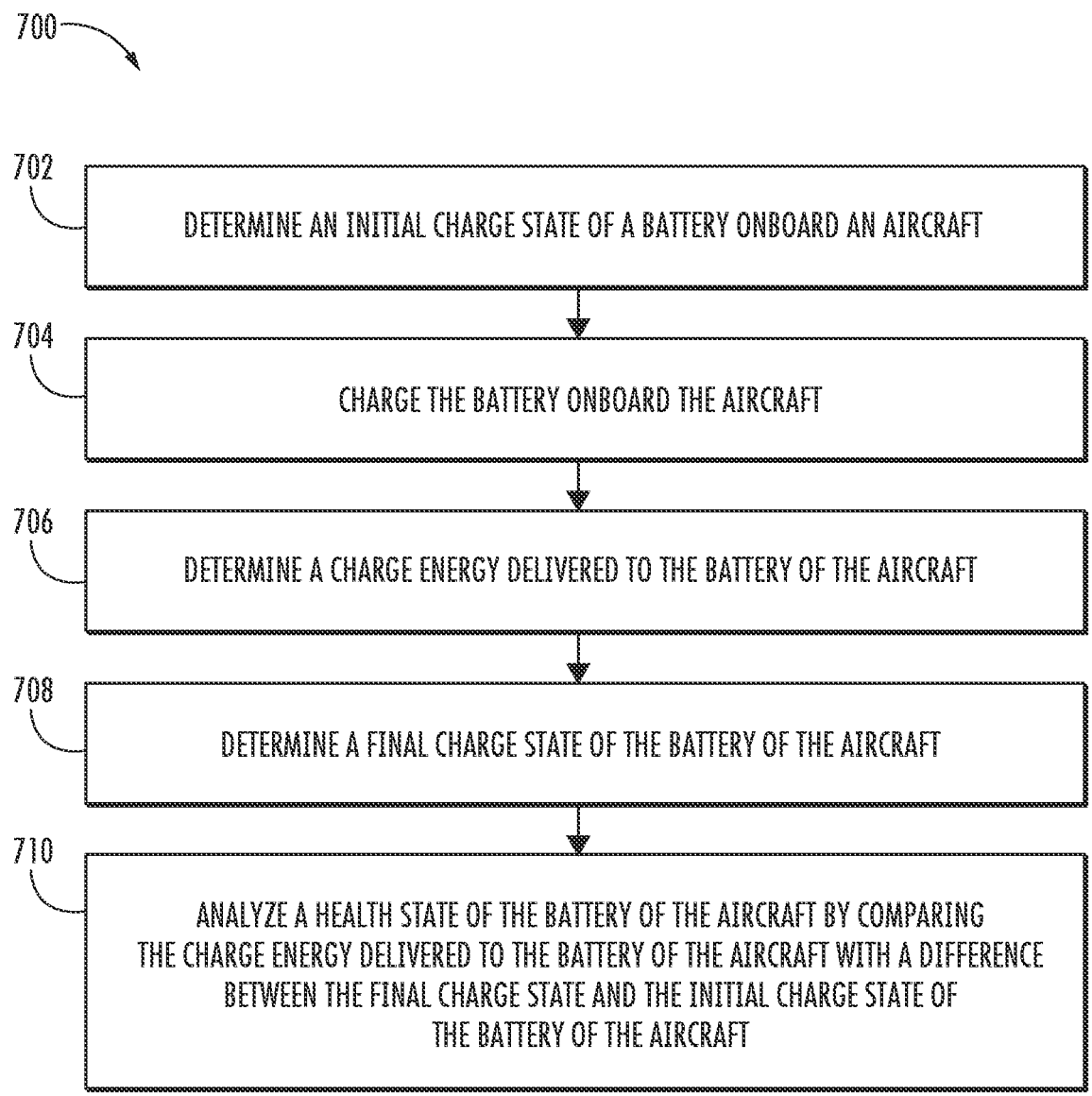
FIG. 7 is a flowchart of a method for charging an aircraft according to aspects of the present disclosure.

FIG. 7 depicts a flow chart diagram of an example method 700 for charging an aircraft. More particularly, the method 700 can detect and/or monitor battery charge level and/or battery health of batteries aboard aircraft. One or more portion(s) of the example method 700 can be implemented by a computing system that includes one or more computing devices such as, for example, the computing systems described with reference to the other figures (e.g., a cloud services system 102, a landing facility computing system 152, a computing system of a robotic charging device 195 (e.g., processor(s) 193 and memory 194) etc.). Each respective portion of the method 600 can be performed by any (or any combination) of one or more computing devices. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One or more portions of the method 700 can be performed additionally, or alternatively, by other systems.

The method 700 may include, at 702, determining an initial charge state of the battery onboard on the aircraft. The initial charge state of the battery can be determined in a variety of manners. For example, the aircraft can be configured to sense or detect a voltage, current, or the like that is indicative of the charge level of the onboard battery. The charge level can be communicated by a computing device of the aircraft, for example, while the aircraft is still in flight and approaching the landing facility and/or communicated after the aircraft has landed. As another example, the initial charge level can be detected by the robotic charging device once it is operatively connected with a charging area (e.g., charging port, wireless charging area) of the aircraft. The initial charge state can be detected by sensing a voltage, current, of the like of the battery and correlating the voltage with a charge level based on characteristics of the battery.

The method 700 may include, at 704, charging the battery onboard the aircraft. For example, a mobile robotic charging device and/or a stationary robotic charging device can charge the aircraft via a charging port and/or wirelessly, for example as described above with respect to FIG. 6. In other embodiments, however, the aircraft can be charged without using a robotic charging device. For example, an operator can connect a charging cable with a charging port of the aircraft.

The method 700 may include, at 706, determining a charge energy delivered to the battery onboard the aircraft (e.g., by the robotic charging devices). For example, the charge energy can be determined from measured characteristics of the charging session. The charge energy can be defined as the total number of units of energy (e.g., Joules, Watt-hours, etc.) applied to the battery during the charging session. Example characteristics of the charging session can include, for example, time, current, voltage, and/or current of the charging session.

The method 700 can include, at 708, determining a final charge state of the battery onboard the aircraft after charging is complete. The final charge state can similarly be measured by the robotic charging device and/or by the aircraft and communicated (e.g., to the computing system, robotic charging device, a cloud computing service/server, or the like).

The method 700 can include, at 710, analyzing a health state of the battery of the aircraft by comparing the charge energy delivered to the battery of the aircraft with a difference between the final charge state and the initial charge state of the battery of the aircraft. The difference between the final charge state and the initial charge state can be compared with the charge energy delivered to the battery to determine information about the batter, such as battery health. For example, a determination that the final charge state is less than a predicted final charge state, can indicate poor battery health as the battery may not retaining all energy applied to the battery. Similarly, if the final charge state is greater than the predicted final charge state, the battery may be malfunctioning at the initial charge state and potentially other lower charge states, which can also indicate poor battery health. In contrast, if the computing system determines that the final charge state is approximately equal to an expected charge, the computing system can determine that the battery is functioning properly e.g., has good battery health. The computing system can be configured to calculate a battery health score or other metric based on one or more of initial charge state, final charge state, and charge energy.

Additional Disclosure

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 6 and 7 depict steps performed in a particular order for purposes of illustration and discussion, the methods of the present disclosure are not limited to the particularly illustrated order or arrangement. The various steps of the methods 600, 700 can be omitted, rearranged, combined, and/or adapted in various ways without deviating from the scope of the present disclosure.

What is claimed is:

1. A system for charging an aircraft, the system comprising:
   one or more processors; and
   one or more non-transitory computer-readable media that collectively store instructions that, when executed by the one or more processors, cause the system to perform operations, the operations comprising:
   obtaining data associated with a transportation itinerary of the aircraft and one or more energy parameters of the aircraft, wherein the data associated with the transportation itinerary is indicative of an aircraft landing facility at which the aircraft is to be located and at least one of a time duration the aircraft is scheduled to be located at the aircraft landing facility, an amount of time for charging the aircraft, or a time at which the aircraft is to depart the aircraft landing facility;
   determining, based at least in part on the data associated with the transportation itinerary, a priority for charging the aircraft, wherein the priority is based on whether the transportation itinerary is associated with passengers or cargo;
   determining, based at least in part on the data associated with the transportation itinerary, the priority for charging the aircraft, and the one or more energy parameters of the aircraft, a robotic charging device, from among a plurality of robotic charging devices, wherein the aircraft is assigned the robotic charging device for charging the aircraft while at the aircraft landing facility;

determining one or more charging parameters for the robotic charging device based at least in part on the data associated with the transportation itinerary; and communicating one or more command instructions for the robotic charging device to charge the aircraft in accordance with the one or more charging parameters, wherein the robotic charging device is configured to automatically connect with a charging area of the aircraft for charging a battery onboard the aircraft.

2. The system of claim 1, wherein the data associated with the transportation itinerary of the aircraft describes:
   a number of passengers currently traveling in the aircraft;
   a number of passengers scheduled to travel in the aircraft; and
   a payload weight of the aircraft.

3. The system of claim 1, wherein the data associated with the transportation itinerary of the aircraft describes at least one of:
   an origination location; or
   a subsequent destination of the aircraft.

4. The system of claim 1, wherein the data associated with the transportation itinerary of the aircraft comprises at least one of:
   a size of the aircraft;
   a weight of the aircraft; or
   an approach heading of the aircraft.

5. The system of claim 1, wherein one or more charging parameters describes at least one of:
   a current charge state of the aircraft;
   a total amount of energy to be delivered to the aircraft;
   a target final charge state of the aircraft;
   a charging voltage;
   a charging duration; or
   a charging current for the aircraft.

6. The system of claim 1, wherein the one or more command instructions describes at least one of an identity of the aircraft or a location of the aircraft.

7. The system of claim 1, wherein the operations further comprise automatically controlling the robotic charging device to operatively connect with the charging area of the aircraft.

8. The system of claim 7, wherein automatically controlling the robotic charging device to operatively connect with the charging area of the aircraft comprises connecting the robotic charging device to a charging port of the aircraft.

9. The system of claim 7, wherein automatically controlling the robotic charging device to operatively connect with the charging area of the aircraft comprises arranging a wireless charging area of the robotic charging device proximate a wireless charging area of the aircraft such that the robotic charging device can charge the battery onboard the aircraft via the wireless charging area of the aircraft.

10. The system of claim 1, wherein the robotic charging device comprises a robotic arm having one end that is stationary with respect to a surface on which the aircraft is positioned.

11. The system of claim 1, wherein the robotic charging device comprises at least one of wheels or tracks configured to transport the robotic charging device on a surface on which the aircraft is positioned.

12. The system of claim 1, wherein determining the one or more charging parameters for the robotic charging device based at least in part on the data associated with the transportation itinerary comprises determining a charge status comprising at least one of:
   an initial charge state of the battery onboard the aircraft;
   a charge energy delivered to the battery onboard the aircraft; or
   a final charge state of the battery onboard the aircraft.

13. The system of claim 12, wherein the operations further comprise analyzing a health state of the battery of the aircraft based on the charge status.

14. A method for charging an aircraft, the method comprising:
   obtaining data associated with a transportation itinerary of the aircraft and one or more energy parameters of the aircraft, wherein the data associated with the transportation itinerary is indicative of an aircraft landing facility at which the aircraft is to be located and at least one of a time duration the aircraft is scheduled to be located at the aircraft landing facility, an amount of time for charging the aircraft, or a time at which the aircraft is to depart the aircraft landing facility;
   determining, based at least in part on the data associated with the transportation itinerary, a priority for charging the aircraft, wherein the priority is based whether the transportation itinerary is associated with passengers or cargo;
   determining, based at least in part on the data associated with the transportation itinerary, the priority for charging the aircraft, and the one or more energy parameters of the aircraft, a robotic charging device, from among a plurality of robotic charging devices, wherein the aircraft is assigned the robotic charging device for charging the aircraft while at the aircraft landing facility;
   determining one or more charging parameters for the robotic charging device based at least in part on the data associated with the transportation itinerary; and
   communicating one or more command instructions for the robotic charging device to charge the aircraft in accordance with the one or more charging parameters, wherein the robotic charging device is configured to automatically connect with a charging area of the aircraft for charging a battery onboard the aircraft.

15. The method of claim 14, wherein the data associated with the transportation itinerary of the aircraft describes:
   a number of passengers currently traveling in the aircraft;
   a number of passengers scheduled to travel in the aircraft; and
   a payload weight of the aircraft.

16. The method of claim 14, wherein the data associated with the transportation itinerary of the aircraft describes at least one of:
   an origination location; or
   a subsequent destination of the aircraft.

17. The method of claim 14, wherein the data associated with the transportation itinerary of the aircraft comprises at least one of:
   a size of the aircraft;
   a weight of the aircraft; or
   an approach heading of the aircraft.

18. The method of claim 14, wherein one or more charging parameters describes at least one of:
   a current charge state of the aircraft;
   a total amount of energy to be delivered to the aircraft;
   a target final charge state of the aircraft;
   a charging voltage;
   a charging duration; or
   a charging current for the aircraft.

19. The method of claim 14, wherein the one or more command instructions describes at least one of an identity of the aircraft or a location of the aircraft.

20. A method for charging an aircraft, the method comprising:
- determining an initial charge state of a battery of the aircraft;
- charging the battery onboard the aircraft, wherein the aircraft is assigned a robotic charging device based on a priority, the priority based on whether a transportation itinerary of the aircraft is associated with passengers or cargo;
- determining a charge energy delivered to the battery of the aircraft;
- determining a final charge state of the battery of the aircraft; and
- analyzing a health state of the battery of the aircraft by comparing the charge energy delivered to the battery of the aircraft with a difference between the final charge state and the initial charge state of the battery of the aircraft.

* * * * *